United States Patent [19]

Jarus

[11] 4,214,124
[45] Jul. 22, 1980

[54] METHOD AND DEVICE FOR EXTRACTING A SYNCHRONIZING SIGNAL FROM AN INCOMING PCM SIGNAL

[75] Inventor: Daniel J. Jarus, XA Kouderkerk aan de Rijn, Netherlands

[73] Assignee: De Staat der Nederlanden, te Dezen Vertegenwoordigd Door de Directeur-Generaal der Posterijen, Telegrafie en Telefonie, The Hague, Netherlands

[21] Appl. No.: 945,223

[22] Filed: Sep. 25, 1978

[30] Foreign Application Priority Data

Sep. 29, 1977 [NL] Netherlands .......................... 7710670

[51] Int. Cl.² .............................................. H04L 7/00
[52] U.S. Cl. ........................................ 375/114; 371/47
[58] Field of Search ................... 179/15 BS; 178/69.1; 328/155; 340/146.1 D

[56] References Cited

U.S. PATENT DOCUMENTS

| 4,002,845 | 1/1977 | Kaul et al. ........................ 179/15 BS |
| 4,035,601 | 7/1977 | Isaacs ................................. 178/69.1 |
| 4,119,796 | 10/1978 | Jones ................................... 178/69.1 |

*Primary Examiner*—Benedict V. Safourek
*Attorney, Agent, or Firm*—Hugh Adam Kirk

[57] ABSTRACT

Method and device for extracting a synchronizing signal from a digital signal. The synchronizing signal can be a single bit, a word or a subframe. A first circuit searches for the synchronizing signal in a fixed position in the received signal every time it should occur. If this circuit does not find the synchronizing signal when it should, a second circuit starts a search action for it in the received signal. When the first circuit has not found the synchronizing signal a fixed number of times, the loss of synchronism will be signalled to the equipment that follows. If in the mean time the second circuit has found the synchronizing signal a fixed number of times in the same position in the received signal, then the first circuit will be synchronized with the second circuit. This synchronism only occurs if the second circuit has found the synchronizing signal a greater number of consecutive times than the first circuit within the same period of time.

14 Claims, 6 Drawing Figures

FIG. 1
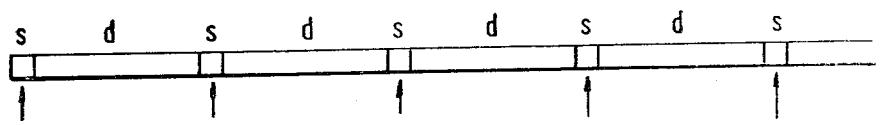
FIG. 2
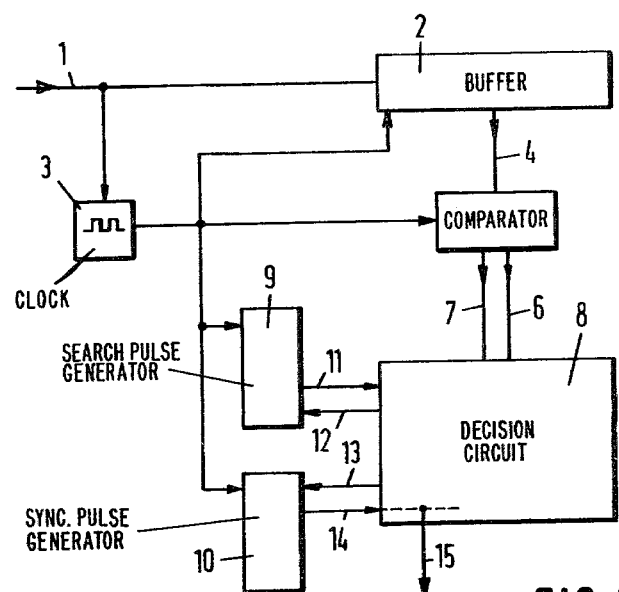
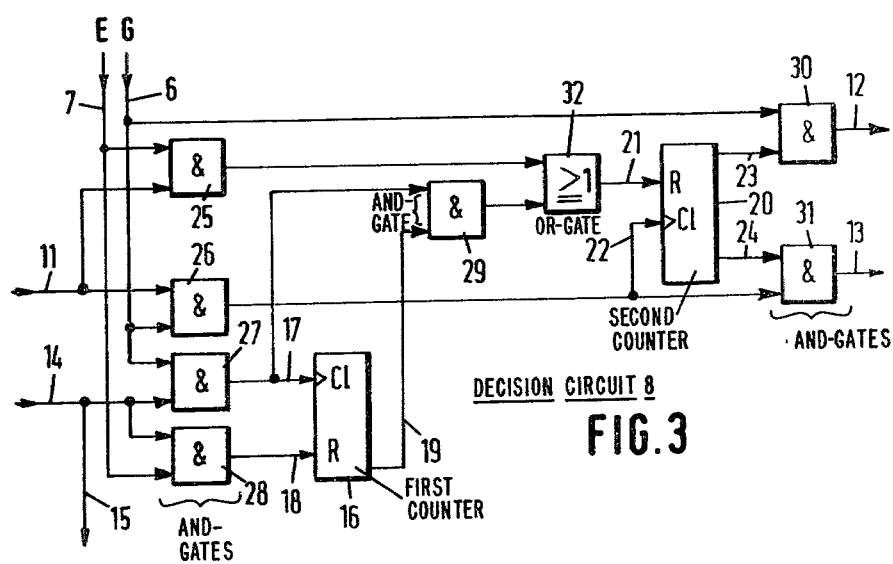
FIG. 3

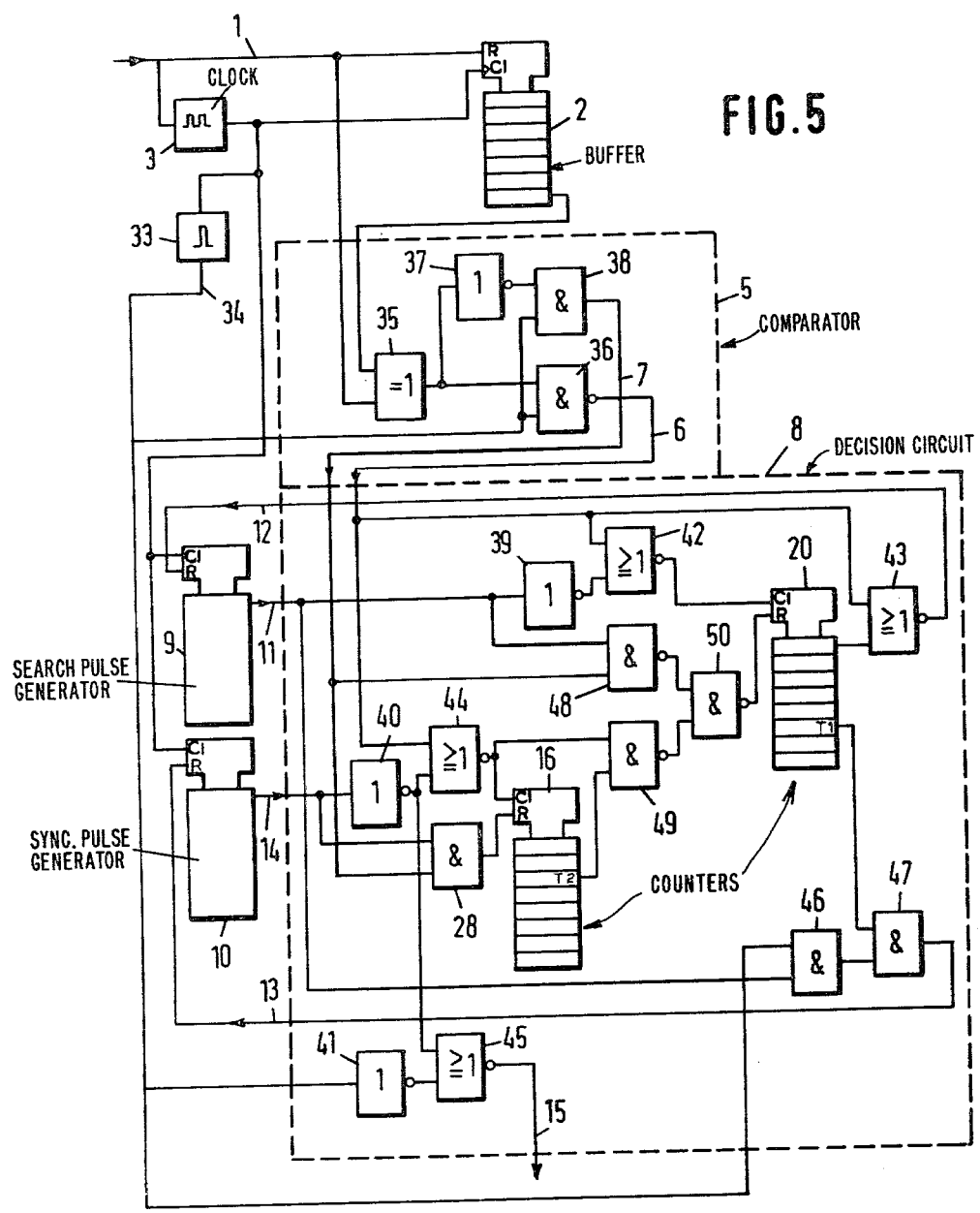

METHOD AND DEVICE FOR EXTRACTING A SYNCHRONIZING SIGNAL FROM AN INCOMING PCM SIGNAL

The invention relates to a method and device for extracting a synchronizing signal from an incoming PCM (pulse code modulation) signal, which synchronizing signal occurs periodically in the incoming signal. Each time this synchronizing signal is found, a synchronizing pulse is delivered to a circuit that follows.

BACKGROUND OF THE INVENTION

In the PCM technique, it is known to transform analogue signals that have to be transmitted to an input of a channel, for example a telephone channel, into pulse series or words, each comprising a fixed number of bits. A fixed consecutive number of said words together forms a subframe; a fixed consecutive number of subframes together forms a frame, and a mixed consecutive number of frames will be designated as a multiframe.

Since the bits of a number of channels are combined in time spaces at the transmitting end, as a consequence the combined channels have to be separated at the receiving end. Thus the problem arises of how to make these two processes take place synchronously. In order to let the receiving end know if there is synchronism with respect to the transmitting end, synchronizing signals can be transmitted in significant positions in each word, subframe, frame and/or multiframe. At the receiving end, it can be deduced from the position of the synchronizing signals in the received signal and from the rhythm of the clock located at that end if there is synchronism between the transmitting end and the receiving end. If it appears that this is no longer the case, this synchronism has to be recovered at the receiving end. However, the received signal may also comprise some bit errors, caused by interference pulses or the like. So when at the receiving end a synchronizing signal is not received correctly or in the right position in the signal, there need not always have been a loss of synchronism, since these faults may also have been caused by bit errors. Hence in many of the known systems the loss of synchronism is only ascertained after several synchronizing signals have been received in error. After this the processing of the received signal can be stopped and a search action be started. Then when the expected synchronizing signal is found in the signal, the synchronism can be recovered with the help of the position of said synchronizing signal in the signal. This occurs only after the synchronizing signal has been correctly received several times. So in its simplest form the resynchronizing process comprises a search action and a recovery action.

According to the known technique a resynchronizing device can comprise an "incorrect"-counter and a "correct"-counter, a search action being started when the "incorrect"-counter has reached a certain state, and a recovery action being started when the "correct"-counter has reached a certain state. Such synchronizing methods and devices are much used.

A drawback of the synchronizing method described is that the time between the erroneous reception of a synchronizing signal and the start of the recovery action is relatively long. Moreover, the system becomes more sensitive to bit errors in case the recovery time set is short.

SUMMARY OF THE INVENTION

The object of the invention is to provide a method and a simple and cheap device, which do not have these drawbacks.

A further object of the invention is to provide a method and a device which are less sensitive to imitations of or bit errors in the synchronizing signal in the received signal.

All this is achieved because a first circuit keeps on searching for the synchronizing signal in one and the same position in the received signal, while a second circuit carries out a second search action in another position in the signal immediately after an incorrect synchronizing signal has been detected. Then a recovery action is carried out when the second circuit has found the synchronizing signal more consecutive times (T1) in the received signal than the consecutive number of times (T2) that the first circuit has found the synchronizing signal in the received signal; in this case T1>T2.

The method according to the invention can be employed in systems utilizing different synchronizing methods.

In a preferred embodiment the device according to the invention is characterized by:
- an input register for recording time selected parts of the received signals;
- a comparator circuit for comparing each successive synchronizing signal part recorded in the input register with a synchronizing signal of known format;
- a clock circuit for delivering clock pulses;
- a first and a second pulse generator, each delivering a pulse after a fixed number of clock pulses from the zero state; and
- a decision circuit processing the output signal of the comparator circuit at the moments indicated by the pulse generators.

This decision circuit comprising a first counter for recording the number of synchronizing signals found in succession at the moments indicated by the first pulse generator, a second counter for recording the number of synchronizing signals found in succession at the moments indicated by the second pulse generator, and a number of gate circuits.

BRIEF DESCRIPTION OF THE VIEWS

The above mentioned and other features, objects and advantages, and a manner of attaining them are described more specifically below by reference to embodiments of this invention shown in the accompanying drawings, wherein:

FIG. 1 represents schematically an example of the time decision structure of a received data signal, in which a synchronizing signal s is inserted after each fixed number of data bits d;

FIG. 2 is a schematic block wiring diagram of a device according to the invention;

FIG. 3 is a schematic block wiring diagram of a preferred embodiment of the decision circuit shown in FIG. 2;

FIG. 5 is a more detailed schematic block wiring diagram of a specific example of a synchronizing circuit of a synchronizing device as shown in FIG. 2, and FIG. 6 are wave form time diagrams of data, clock and pulse signals which occur in to the circuit according to FIG. 5.

DETAILED DESCRIPTION OF PREFERRED EMBODIMENTS

Figure 4:
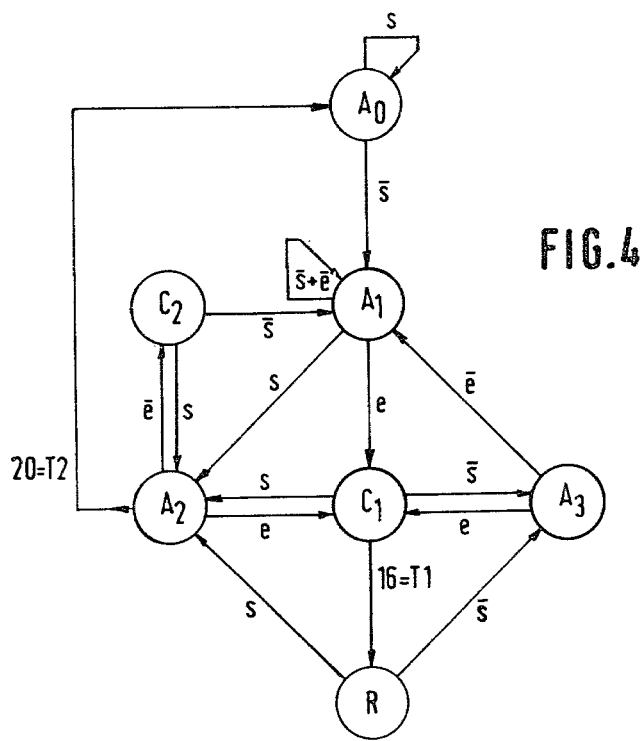
FIG. 4 is a function diagram of the synchronizing device according to the invention.

FIG. 1 shows part of a data signal in which the bit words for data are invariably designated by a "d", whereas the synchronizing bits are designated by an "s". In larger units, such as frames and multiframes, the synchronizing signals designated by an "s" can be a whole bit word. This is of no vital importance for the working principle of the circuit that will be described hereinafter. The structure of each synchronizing signal and its position in the signal are known at the receiving end, so that, for ascertaining the presence and the correctness of said, synchronizing signal it will suffice to compare, at the right moment, the received signal with the signal stored in the receiver.

FIG. 2 shows a block wiring diagram of a device according to the invention, in which a signal input 1 introduces the incoming signal into a buffer 2, and to a clock 3 which clock derives a clock pulse from this signal. The buffer 2 has an output connection 4 to a comparator circuit 5 with two outputs 6 and 7. The output 6 carries a logic "1" if the received signal corresponds with a reference synchronizing signal, and the outout 7 carries a logic "1", if the received signal does not correspond with the reference synchronizing signal. These outputs 6 and 7 are connected with a decision circuit 8, with which are also connected a pulse generator 9 used for the aforecited search action, and a pulse generator 10 for generating a synchronizing pulse indispensable for the equipment that follows. The pulse generator 9 receives a signal from the clock 3 and delivers a pulse after each fixed number of received bits to the decision circuit 8 via an output 11. The pulse generator 9 can be reset by the decision circuit 8 via an input 12. The pulse generator 10, which is also connected with the clock 3, has a resetting input 13 connected with the decision circuit 8, and an output 14 which is also connected with the output 15 of the synchronizing unit or decision circuit 8 to deliver the synchronizing pulse to the equipment that follows.

When a correct synchronizing signal has been received several times, there will be synchronism between the pulse generators 9 and 10. This synchronism will be disturbed as soon as an incorrect synchronizing signal has been received, and the pulse generator 9 will be reset as soon as the next correct synchronizing signal is found in the received signal. This detection of an incorrect synchronizing signal, causes the start of the search action which will be continued until the synchronizing signal is found a number of consecutive times in the received signal. Then the decision circuit 8 ascertains if the rhythm of the pulse generator 9 is correct, and if it is correct, it synchronizes the pulse generator 10 with the pulse generator 9.

The workings of the buffer 2, the clock circuit 3, the comparator circuit 5, and the pulse generators 9 and 10 are generally known, and therefore their workings are not further explained in this text.

FIG. 3 represents a preferred embodiment of the decision circuit 8 with inputs 6, 7, 11 and 14, and outputs 12,13 and 15. This decision circuit includes a first counter 16 and a second counter 20 plus AND-gates 25, 26, 27, 28, 29, 30 and 31, and an OR-gate 32. This first counter 16 has a clock input 17, a recovery input 18 and an output 19 corresponding with an adjustable counter value. The second counter 20, has a recovery input 21, a clock input 22, a zero output 23 and an output 24 corresponding with an adjustable counter value.

A logic "1" will appear at the input 11, when the pulse generator 9, which belongs to a search circuit, delivers a pulse. A "1" will appear at the input 14, when the pulse generator 10 delivers a pulse.

If at the amount when a synchronizing pulse appears at the input 14, a correct synchronizing signal is received (i.e. the input 6 carries a "1"), "1" will appear, via the AND-gate 27, at the clock input 17 of the counter 16, and the state of the counter 16 will be increased by "1". After each pulse of the AND-gate 27 the counter makes a further step until the final state T2 is reached which is maintained. When reaching this counter state T2, a "1" will appear at the output 19, in consequence of which a "1" is offered via the AND-gate 29 and OR-gate 32 to the recovery input 21 of the counter 20, so that a "1" will also appear at the output 23, and the output 12 will take the "1" state as well; in this way the pulse generator 9 is synchronized with the pulse generator 10.

When an incorrect synchronizing signal is found in the received signal, a "1" will appear at the input 7, so that at the appearance of a "1" at the input 14, a "1" will be fed to the recovery input of the counter 16 via the AND-gate 28, in consequence of which said counter 16 will be reset to the zero state. Assuming the pulse generator 9 is still synchronized with the pulse generator 10, a "1" will appear simultaneously at the inputs 11 and 14, so that when the incorrect synchronizing signal is received, a "1" will be fed via the AND-gate 25 and OR-gate 32 to the recovery input 21 of the counter 20, which, as a consequence, will be reset also to the zero state.

The Search Procedure

When a correct synchronizing signal is found in some position in the received signal, a "1" will appear at the input 6 and a "1" will be fed to the ouput 12 via the AND gate 30, so that the pulse generator 9 will be reset, and the pulse generators 9 and 10 will no longer by synchronous. The pulse generator 10 goes on delivering synchronizing pulses via the output 15 to the equipment that follows; the pulse generator 9 has started the search action. Both counters have been reset to the zero state.

The reception of the incorrect synchronizing signal can have two causes:

1. the synchronizing signal comprises one or more incorrect bits;
2. the synchronism has got lost.

re 1 It can be expected that at the moment the pulse generator 10 delivers a pulse, a correct synchronizing signal will be found. The state of the counter 16 will then be increased by 1 via the gate 27. The reception of each next correct synchronizing signal will increase the state of the counter 16 by one, until the state T2 is reached, in consequence of which a "1" will appear at the output 19, and, via the gates 29 and 32, also at the recovery input 21 of the counter 20. After this, the procedure described above will start again, i.e. normal correct synchronization.

re 2 In this case there are two possibilities:
    2.1 simultaneously with the pulse of the pulse generator 9 at the input 11 an incorrect synchronizing signal is received. Then the counter 20 will be reset to the zero state via the gates 25 and 32, and when the next correct synchronizing signal has been received a "1" will appear at the output 12, so that the pulse generator 9 will be reset and the search action in the received signal will concentrate on another position;

2.2 simultaneously with the pulse of the pulse generator 9 at the input 11 a correct synchronizing signal is found, so that a "1" will appear at the clock input of the counter 20 via the gate 26, and the state of this counter will be increased by one. When this situation has occurred a number of consecutive times, the counter 20 will reach the state T1. Now it has appeared that the correct synchronizing signal is received at the moment when the pulse of the pulse generator 9 appears at the input 11, so that the search action can be concluded. Now the recovery action will take place because a "1" is fed to the output 13 via the gate 31, in consequence of which the pulse generator 10 will be reset and synchronized with the pulse generator 9.

From the above it can be deduced that a synchronizing error to the following system at the receiver is only signalled when T2 synchronizing signals in a different location have been received (or generator 9 is reset) and that this synchronizing signal in its new location will be accepted after T1 correct synchronizing signals have been received. This implies that the value T1 must be greater than the value T2. The choice of the values T1 and T2 is of importance for an optimum functioning of the resynchronization; the ratio between the values T1 and T2, however, depends on the system.

It is self-evident that the realization of the circuit described is not limited to that of FIG. 3. By replacing the AND-gates and OR-gates by other logic circuits the same effect can be achieved; as such alternatives can be worked out according to the generally known technique, this possibility will therefore be left out of consideration in this description. Moreover, it has to be remarked that a circuit of the sort described, particularly thanks to the many possibilities of utilization it offers and its simple structure, lends itself admirably to be used in the form of a microcircuit, in which the counters 16 and 20 can be connected to outward terminals with a view to the system-dependent setting of the values T1 and T2.

FIG. 4 is a diagram representing the method according to the invention.

With the help of the states of the counters 16 and 20 the conditions are elucidated below.

| condition | state of the counter 20 | state of the counter 16 | remarks |
|---|---|---|---|
| $A_0$ | 0 | $\geq T2$ | starts search action |
| $A_1$ | 0 | 0 | |
| $A_2$ | — | $<T2$ | state of the counter 16 is increased by 1. |
| $A_3$ | $>0$ | 0 | |
| $C_1$ | $<T1$ | — | state of the counter 20 is increased by 1. |
| $C_2$ | 0 | $>0$ | |
| R | T1 | — | pulse generator 9 synchronized with pulse generator 10. |

The letter s (in FIG. 4) indicates that the synchronizing signal is found at the moment when a pulse appears at the output 14 of the pulse generator 10; the letter e indicates that the synchronizing signal is found at the moment when a pulse appears at the output 11 of the pulse generator 9. In the case of normal synchronism the system remains in the condition $A_0$; this is indicated by the arrow s, which returns to its starting point.

The fact that a correct synchronizing signal has not been received at said moments is indicated by $\bar{s}$ and $\bar{e}$, respectively. If the correct synchronizing signal is once not received at the right moment, the condition $A_1$ will arise, because the counter 20 is reset to the zero state. This implies the start of the search action.

It has already been said before that when an incorrect synchronizing signal is found, this can have two causes, to wit:

1. a single bit error in the synchronizing signal; the next synchronizing signal is likely to be correct again, which will lead to the condition $A_2$.
2. the synchronism is disturbed; after searching for some time a synchronizing signal will be found at the moment indicated by the pulse generator 9, after which the condition $C_1$ will arise. This condition will be maintained as long as the synchronizing signal is found at the moment indicated by the pulse generator 9, but no more than T1 times; after the signal has been found T1 times, the conditon R will arise, in which the pulse generator 10 will be synchronized with the pulse generator 9. As soon as a next correct synchronizing signal has been received the condition $A_2$ will arise.

After a correct synchronizing signal has been received T2 times, the condition $A_2$ will change into the condition $A_0$ again. The condition that T2 correct synchronizing signals must be received consecutively is necessary in order to prevent the device from getting into the state of rest ($A_0$) before synchronization is certain, because a number of bits belonging to message signals have been taken for synchronizing signals one or more times.

In the condition $A_2$ there are four possibilities:

1. the synchronizing signal is correctly received T2 times in succession, after which the condition $A_0$ will arise;
2. a single bit error presents itself in consequence of which a search action is started immediately; the synchronizing signal, however, is found neither at the moment indicated by the pulse generator 9 nor at the moment indicated by the pulse generator 10, in consequence of which the condition $C_2$ will arise. Since it concerns a single bit error the condition $A_2$ will be re-established, if a synchronizing signal is correctly received at the next pulse of the pulse generator 10.
3. the synchronism gets lost again, which means that the synchronizing signal is not found at the moments indicated by the pulse generators 9 and 10, in consequence of which the condition $C_2$ will arise and subsequently the condition $A_1$, after which the procedure that has been described above will be carried out;

4. the synchronism of the system gets lost, but a synchronizing signal is found at the moment indicated by the pulse generator 9; this will lead to the condition $C_1$.

The condition $A_3$ is reached and left in the way as indicated in the diagram; this state is an intermediate state via which the conditions $A_1$ and $C_1$ can be reached again, after a synchronizing signal has not been found in the condition $C_1$ at any of the moments indicated by the pulse generators 9 and 10, or in case no synchronizing signal has been found in the condition R at the moment indicated by the pulse generators 9 and 10, which are then synchronous.

FIG. 5 shows by way of example an embodiment of a diagram of a synchronizing device according to the invention. The signal received via the input 1 comprises a synchronizing bit per every 8 bits; the synchronizing bits alternately have the value "1" or the value "0". Every time the comparator circuit 5 compares the bit arriving at the input 1 with the bit recorded in the eighth position of the shift register 2.

Figure 6:
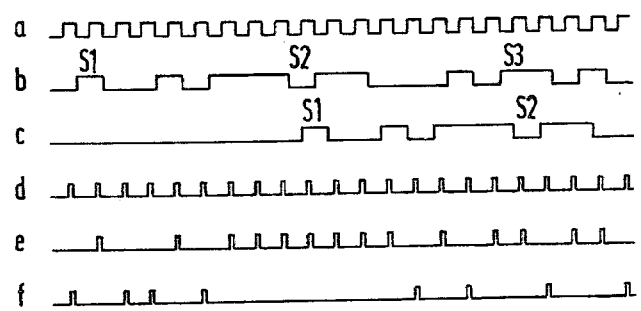

FIG. 6 shows the position plotted against the time of a number of signals of the circuit according to FIG. 5, notably on line a the output signal of the clock circuit 3;
on line b the data signal arriving at the input 1; the bits indicated by S1,S2 and S3 are synchronizing bits;
one line c the signal appearing at the output of the shift register 2 (FIG. 5);
on line d the position of the pulse signal at the output 34 (FIG. 5) of the pulse shaper 33 (FIG. 5);
on line e and f the pulse signals at the outputs 6 and 7, respectively (FIG. 5).

A pulse will appear at the output 6, if the two data bits on the lines b and c are different; a pulse will appear at the output 7, if the two data bits on the lines b and c are equal.

The use of the pulse (FIG. 6, line d) of the pulse shaper 33 is desirable in order to avoid ambiguous signals caused by an incomplete coincidence of the pulse edges of the data signal and the clock signal. The pulse generators 9 and 10 are here realized in the form of dividers effecting a division by eight, because an investigation whether the synchronizing bits correspond or do not correspond needs only to be made once per eight bits. In this embodiment the decision circuit 8 comprises the counters 16 and 20, three negators 39, 40 and 41, four NOR-gates 42, 43, 44 and 45, three AND-gates 28, 46 and 47, and three NAND-gates 48, 49 and 50. After the description of the FIGS. 2 and 3 it is not necessary to give a further elucidation of the functioning of said embodiment; the results gained are the same. The AND-gate 46 has been inserted in order to make it possible to reset the pulse generator 10 in a reliable way; as to its function the AND-gate 47 corresponds with the AND-gate 31 (FIG. 3). The circuit formed by the negator 41 and the NOR-gate 45, which serves to make the synchronizing pulse to be delivered via the output 15 insensitive to signal transitions which do not completely coincide, need not be inserted in the decision circuit 8, but can also be mounted outside this circuit.

It stands to reason that the decision circuit 8 can be realized in many other configurations without any influence on the functioning of the circuit.

While there is described above the method and principles of this invention in connection with specific apparatus, it is to be clearly understood that this description is made only by way of example and not as a limitation to the scope of this invention.

What we claim is:

1. Method for extracting a synchronizing signal from an incoming PCM signal having a synchronizing signal occurring periodically in the incoming signal being searched and a synchronizing pulse being delivered to a following circuit when said synchronizing signal is found in said incoming signal, said method comprising: searching for and counting the synchronizing signals in one and the same position in the received signal, detecting an incorrect synchronizing signals, and searching for the synchronizing signal simultaneously in another position in the incoming signal immediately after an incorrect synchronizing signal has been detected.

2. Method in accordance with claim 1, wherein a resynchronizing action is carried out when a synchronizing signal has been found T1 consecutive times in another position in the received signal, unless a state of rest is re-established because of the fact that the original synchronizing signal has been found T2 consecutive times in the original position in the received signal; in this case $T1 > T2$.

3. Method in accordance with claim 2, wherein the resynchronizing action is carried out by synchronizing the first search action with the second search action, after which the state of rest will be re-established after the correct synchronizing signal has been found T2 times.

4. Device for extracting a synchronizing signal from an incoming PCM signal, comprising:
   an input register for recording part of the received signal;
   a comparator circuit for comparing a signal part recorded in the input register with a synchronizing signal of known format and detecting said synchronizing signal in a given location;
   a clock circuit for delivering clock pulses to said comparator circuit and to
   a first and a second pulse generator responsive to a synchronizing signal detected in said given and in another location in said incoming PCM signal, respectively, each pulse generator delivering a pulse every time after a fixed number of clock pulses from the zero state; and
   a decision circuit processing the output signal of the comparator circuit at the moments indicated by pulses from said pulse generators.

5. Device in accordance with claim 4, wherein the decision circuit comprises:
   a first counter (16) for recording the number of synchronizing signals found in succession in the received signal at the moments indicated by the first pulse generator (10);
   a second counter (20) for recording the number of synchronizing signals found in succession in the received signal at the moments indicated by the second pulse generator (9);
   a number of gate circuits.

6. Device in accordance with claim 5, wherein the state of the first counter (16) is increased by one every time a synchronizing signal is found in succession at the moment indicated by the first pulse generator (10), and wherein the first counter (16) is reset every time a synchronizing signal is not found at the moment indicated by the first pulse generator (10).

7. Device in accordance with claim 5, wherein the state of the second counter (20) is increased by one every time a synchronizing signal is found in succession at the moment indicated by the second pulse generator (9), and wherein the second counter (20) is reset if a synchronizing signal is not found at the moment indicated by the second pulse generator (9), or if the first counter (16) reaches a fixed value (T1).

8. Device in accordance with claim 4, wherein the first pulse generator (10) is synchronized with the second pulse generator (9) every time the second counter has reached a fixed value (T2) and a synchronizing signal if found at the moment indicated by the second pulse generator (9).

9. Device in accordance with claim 4, wherein the second pulse generator (9) is reset every time a synchronizing signal is found in the received signal and/or the second counter (20) is in the zero state.

10. A method of reframing a frame-structured communication signal comprising the steps of
  a. generating first timing signals in response to the periodical detection of synchronization patterns in a first place in said frame-structured communication signal;
  b. counting the number of successive occurrences of said synchronization patterns in said first place to a maximum counted value T2;
  c. generating second timing signals in response to the detection of a synchronization pattern in a second place in said frame-structured communication signal after a non-occurrence of said synchronization patterns in said first place;
  d. counting the number of successive occurrences of said synchronization patterns in said second place to a maximum counted value T1, so that $T1 > T2$;
  e. setting said first timing signals in alignment with said second timing signals when the counted value of T1 is reached before the counted value of T2, and
  f. maintaining said first timing signals when the counted value of T2 is reached before the counted value of T1.

11. A method of reframing a frame-structured communication signal as claimed in claim 10, in which the counting of the number of successive occurrences in said first place is started from zero after every coincidence of a non-occurrence of said synchronizing pattern and said first timing signal.

12. A method of reframing a frame-structured communication signal as claimed in claim 10, in which the counting of the number of successive occurrences in said second place is started from zero after every coincidence of a non-occurrence of said synchronization pattern and said second timing signal.

13. A method of reframing a frame-structured communication signal as claimed in claim 10, in which the counting of the number of successive occurrences in said second place is started from zero after every occurrence of said synchronization pattern after the value T2 has been reached.

14. Apparatus for reframing a frame-structured communication signal comprising:
  signal detecting means (2, 4, 5) connected to receive a frame communication signal and to detect a synchronization pattern in said communication signal;
  first generating means (10) to generate first timing signals periodically in response to the periodical detection of said synchronization patterns in a given location;
  second generating means (9) to generate second timing signals periodically in response to the detection of said synchronization patterns in another location;
  decision means (8) connected to generate pulses for resetting the generating means (9, 10) in response to
    a. a given number of successive occurrences of said first timing signals with the detection of a synchronization pattern, and
    b. a greater than said given number of successive occurrences of said second timing signals with the detection of a synchronization pattern.

* * * * *

UNITED STATES PATENT AND TRADEMARK OFFICE
CERTIFICATE OF CORRECTION

PATENT NO. : 4,214,124
DATED : July 22, 1980
INVENTOR(S) : Daniel Jan Jarus

It is certified that error appears in the above-identified patent and that said Letters Patent are hereby corrected as shown below:

Column 3, line 17, omit "," after "said"; line 17, insert -- , -- after "signal"; line 28, change "outout" to -- output -- ; line 31, omit "," after "8";

Column 4, line 9, change "amount" to -- moment --; line 11, after "," (first occurrence) insert -- a --; line 33, before "will" insert -- also -- line 43, change "by" to -- be --.

Column 7, line 29, change "one" to -- on --; line 33, change "line" to -- lines -- .

Signed and Sealed this

Thirteenth Day of January 1981

[SEAL]

Attest:

SIDNEY A. DIAMOND

Attesting Officer

Commissioner of Patents and Trademarks